United States Patent
Wu et al.

(10) Patent No.: US 8,225,852 B2
(45) Date of Patent: Jul. 24, 2012

(54) HEAT EXCHANGER USING AIR AND LIQUID AS COOLANTS

(75) Inventors: Alan K. Wu, Kitchener (CA); Kenneth Abels, Oakville (CA)

(73) Assignee: Dana Canada Corporation, Oakville, Ontario (CA)

( * ) Notice: Subject to any disclaimer, the term of this patent is extended or adjusted under 35 U.S.C. 154(b) by 1120 days.

(21) Appl. No.: 12/112,088

(22) Filed: Apr. 30, 2008

(65) Prior Publication Data

US 2009/0272515 A1  Nov. 5, 2009

(51) Int. Cl.
*F28D 7/16* (2006.01)
(52) U.S. Cl. .................. 165/140; 165/149; 165/153
(58) Field of Classification Search .................. 165/140, 165/149, 152, 153
See application file for complete search history.

(56) References Cited

U.S. PATENT DOCUMENTS

| | | | |
|---|---|---|---|
| 4,620,588 A | 11/1986 | Pfouts et al. | |
| 4,685,430 A | 8/1987 | Ap | |
| 5,097,891 A | 3/1992 | Christensen | |
| 6,089,313 A | 7/2000 | Levy et al. | |
| 6,095,240 A | 8/2000 | Hassanein et al. | |
| 6,305,466 B1 | 10/2001 | Andersson et al. | |
| 6,332,495 B1 | 12/2001 | Jamison et al. | |
| 6,619,379 B1 | 9/2003 | Ambros et al. | |
| 6,688,292 B2 | 2/2004 | Ruppel et al. | |
| 6,755,158 B2 | 6/2004 | Knecht et al. | |
| 7,165,537 B2 | 1/2007 | Agee et al. | |
| 7,523,781 B2* | 4/2009 | Oh et al. .................. | 165/153 |
| 2001/0054499 A1 | 12/2001 | Gerard et al. | |
| 2002/0023734 A1* | 2/2002 | Wagner .................. | 165/81 |
| 2004/0188070 A1 | 9/2004 | Kruger et al. | |
| 2005/0006066 A1 | 1/2005 | Emrich et al. | |
| 2005/0109485 A1 | 5/2005 | Kolb et al. | |
| 2005/0161194 A1 | 7/2005 | Emrich et al. | |
| 2006/0086489 A1* | 4/2006 | Ohata et al. .................. | 165/153 |
| 2006/0266501 A1 | 11/2006 | So et al. | |
| 2007/0125527 A1 | 6/2007 | Flik et al. | |

FOREIGN PATENT DOCUMENTS

| | | |
|---|---|---|
| DE | 3200688 A1 | 7/1983 |
| DE | 3400519 A1 | 7/1985 |
| DE | 103 52 880 A1 | 6/2005 |
| DE | 103 54 382 A1 | 6/2005 |
| JP | 61059188 | 8/1984 |
| WO | WO 2004/005828 | 1/2004 |

* cited by examiner

*Primary Examiner* — Teresa Walberg
(74) *Attorney, Agent, or Firm* — Ridout & Maybee LLP (57) ABSTRACT

A heat exchanger suitable for a vehicle includes a plurality of tubular first members arranged in a row and forming elongate gaps. These members form passageways for flow of a first fluid for heat exchange with cooling air flowing through the gaps. The first members and gaps form a primary heat exchange area. Inlet and outlet manifolds are connected to the first members for directing the first fluid through the first members. An associated cooling device circulates liquid coolant and comprises flat tube-like second members, each extending into a respective gap in a secondary area which is part of the primary area but smaller. The second members each have a thickness at least the width of their respective gaps. At least some of the first members can be formed with cut-outs in opposite flat sides, these cut-outs being sealingly closed by the second members.

20 Claims, 5 Drawing Sheets

HEAT EXCHANGER USING AIR AND LIQUID AS COOLANTS

BACKGROUND OF THE INVENTION

This invention relates to heat exchangers including charge air coolers such as those used for vehicles.

It is known to provide heat exchangers in the form of charge air coolers that have opposing inlet and outlet collection tanks or manifolds fluidly connected by tubes that direct the charge air from the inlet tank or manifold of the cooler to the outlet tank or manifold. A recent example of such a cooler is that taught in U.S. Pat. No. 6,755,158 issued Jun. 29, 2004 to Modine Manufacturing Company. This particular charge air cooler has a coolant-filled pre-cooler oriented in the air collection tank. The pre-cooler is sized to contact most of the charge air entering the cooler. The pre-cooler has flow paths carrying coolant between manifolds of the pre-cooler and the flow paths define channels therethrough to direct charged air through the pre-cooler and into a cooling grate.

Another example of a charge air cooler is that taught in German published application 3200688 A1 wherein a second heat exchanger unit has inflow and outflow lines or manifolds with flat tubes extending between these two manifolds. The tubes of the second heat exchanger are in parallel arrangement to air cooled tubes. Cooling of the charge air takes place by heat exchange between the charge air and cooling air. In the illustrated embodiment, there are three alternating layers in the complete air cooler. These layers including vertically extending tubular passageways for charge air, the vertically extending tubes for the coolant, and layers for the passage of cooling air horizontally through the heat exchanger.

It is foreseen that the exhaust limits of vehicles, particularly those with diesel engines, will place larger demands on heat exchangers. There may be a need for the temperature of charge air exiting the charge cooler to be reduced much further than previously even though the charge air entering the charge cooler will have a much higher temperature than previously. These new parameters for air charge coolers should, if possible, be met without requiring significantly larger design space for the charge air cooler.

It is therefore desirable to provide a heat exchanger such as a charge air cooler which is able to provide additional means for cooling a first heat exchanging fluid, such as charge air, in addition to the normal cooling air flowing through the heat exchanger, this additional means taking the form of an associated cooling device for circulating a liquid coolant for heat exchange between the coolant and the first fluid this cooling device being located to a significant extent within the area occupied by the normal heat exchanger components. It is further desirable if such a heat exchanger can be provided with such an associated cooling device that employs liquid coolant without the need to alter the first fluid side of the heat exchanger in a way which would increase the first fluid side pressure drop.

In an exemplary embodiment of the heat exchanger described herein, the liquid coolant side of the heat exchanger can increase the amount of heat removed from the first fluid (for example, charge air) as compared to an all air-cooled heat exchanger since the first fluid is partially cooled by the liquid coolant which can be water.

In some embodiments of the present heat exchanger constructed for use as a charge air cooler, the associated cooling device that circulates the liquid coolant can desirably be located in a relatively inexpensive manner to an area or region of the heat exchanger which may be or is considered to be an air flow "dead zone", thus permitting good heat exchange in this area despite the clear or perceived difficulty of air cooling this area.

It is further desirable to provide the aforementioned heat exchanger withan associated cooling device that uses liquid coolant in an exemplary embodiment without the need to provide complex manifolding as well in order to deliver the liquid coolant to the associated cooling device and remove liquid coolant therefrom.

SUMMARY OF THE INVENTION

According to one aspect of the invention, a heat exchanger suitable for a vehicle comprises a plurality of generally flat, tubular first members arranged in a row and forming a series of elongate gaps which are defined by and extend between the first members, these first members providing a series of first passageways for flow of a first fluid in heat exchange relationship with cooling air flowing through the gaps during use of the heat exchanger. The first members and the gaps form a primary heat exchange area having a length extending at least most of the length of the first members and a width substantially equal to the total of the widths of the gaps and the thicknesses of the first members. There are also provided a first inlet manifold extending along one end of the heat exchanger and fluidly connected to adjacent first ends of the first members to direct first fluid flow into the first passageways and a first outlet manifold extending along an opposite end of the heat exchanger and fluidly connected to adjacent second ends of the first members to receive the first fluid flow from the first passageways. There is further provided an associated cooling device for circulating a liquid coolant for heat exchange between the liquid coolant and the flow of first fluid through the first passageways. The cooling device includes generally flat, tube-like second members each extending into a respective one of the elongate gaps in a secondary heat exchange area, which is part of the primary heat exchange area and substantially smaller than the latter area. The second members each have a thickness at least as large as the widths of their respective gaps so that each second member fills its respective gap in the widthwise direction of the gap.

According to another aspect of the invention disclosed herein, a heat exchanger includes a plurality of tube-like first members having respective first inlet and first outlet distal end portions defining respective first inlet and first outlet openings, these first members being spaced apart from one another so that a series of elongate gaps are formed between the first members. The first members form a plurality of first passageways for flow of a first fluid air in heat exchange relationship with cooling air flowing through the gaps during use of the heat exchanger. The first members and the elongate gaps form a primary heat exchange area having a length extending at least most of the length of one of the first members and a width equal to the total of the heights of the first members and the widths of the gaps. There are also opposed inlet and outlet manifold members connected respectively to the first inlet and first outlet distal end portions. The first inlet manifold is adapted to receive the first fluid and conduct the first fluid to the first inlet openings while the outlet manifold is adapted to receive the first fluid which has been cooled by the cooling air. A plurality of tube-like second members are arranged in a row and have end portions defining second inlet and second outlet openings with all of the second inlet openings being joined and all of the second outlet openings being joined so as to form respectively a second inlet manifold and a second outlet manifold. The second inlet manifold is adapted to receive a liquid coolant and conduct the liquid coolant to a plurality of second passageways formed by the second members. The second outlet manifold is adapted to receive the liquid coolant from the second passageways. The second members include two outer second members at opposite ends of the row and intermediate second members located between the outer members. At least the intermediate second members each extend into a respective one of the elongate gaps for heat exchange between the first fluid and the liquid coolant. The second members fill a portion only of the gaps, this portion extending over a secondary heat exchange area which is part of the primary heat exchange area.

Example embodiments of the invention will now be described, by way of example, with reference to the accompanying drawings, throughout which like reference numerals are used to refer to similar elements and features.

DETAILED DESCRIPTION OF PREFERRED EMBODIMENTS

Illustrated in FIGS. 1 to 4 is a heat exchanger 10 suitable for use as a charge air cooler. Although the following detailed description is directed primarily to an exemplary embodiment intended for use as a charge air cooler, it will be appreciated other embodiments incorporating one or more aspects of the invention can also be constructed such as heat exchangers for cooling a fluid such as oil. The air cooling side of the illustrated heat exchanger, that is that portion which does not include a liquid coolant circuit described hereinafter, can be constructed according to the construction details of the plate and fin type heat exchanger taught in U.S. Pat. No. 6,332,495 issued Dec. 25, 2001 to Long Manufacturing Ltd. The description and drawings of this US patent are incorporated herein by reference. Although the heat exchanger described and illustrated in U.S. Pat. No. 6,332,495 is for air cooling engine coolant, it will be appreciated by those skilled in the heat exchange art that it can be routinely modified, for example, by increasing the size of the passageways formed by the plate pairs for the flow of charge air, to serve as a charge air cooler. The heat exchanger 10 includes a plurality of tube-like first members 12 having respective first inlet distal end portions located at 14 and first outlet distal end portions located at 16 defining respective first inlet and first outlet openings. The location of the first inlet openings is indicated at 18 in FIG. 3 and it will be appreciated that the outlet openings are arranged and located in a manner similar to these inlet openings but at the opposite ends of the first members. The first members 12 are spaced apart from one another so the series of elongate gaps 20 are formed between the first members. In the illustrated exemplary embodiments, these gaps have cooling fins 22 mounted therein, except in the area of the liquid coolant circuit to be described. These fins, which commonly are made from a thin, corrugated metal plate, typically made of aluminum alloy or aluminium, are arranged to permit cooling air indicated by the arrows A in FIG. 1 to flow through the gaps and along the fins. It will be understood that the fins are arranged over at least most of the length and the width of a primary heat exchange area, excluding a secondary heat exchange area where the liquid coolant circuit is located.

The heat exchanger can be provided with a first fluid inlet or charge air inlet 24 leading to a first fluid or charge air manifold 26. The first fluid inlet can be formed by a short connecting pipe 28 which can have a relatively large diameter when the first fluid flow is charge air flow. This pipe can be adapted for connection to a longer charge air pipe which can deliver charge air at an entry temperature of up to 300° C. or more, the high temperature of this charge air being reduced substantially as explained more fully hereinafter by the cooling air flow through the gaps 20 and the liquid coolant in the liquid coolant circuit. After the first fluid passes through first passageways formed by the first members 12, the cooled first fluid is collected in an outlet manifold 30 which delivers the fluid to first fluid outlet 32. This outlet can be formed by a short connector pipe 34 which is rigidly connected to the manifold. When the first fluid is charge air, the pipe 34 can be connected to a longer air pipe (not shown) for supplying the charge air to the individual cylinders of an internal combustion engine.

Figure 3:
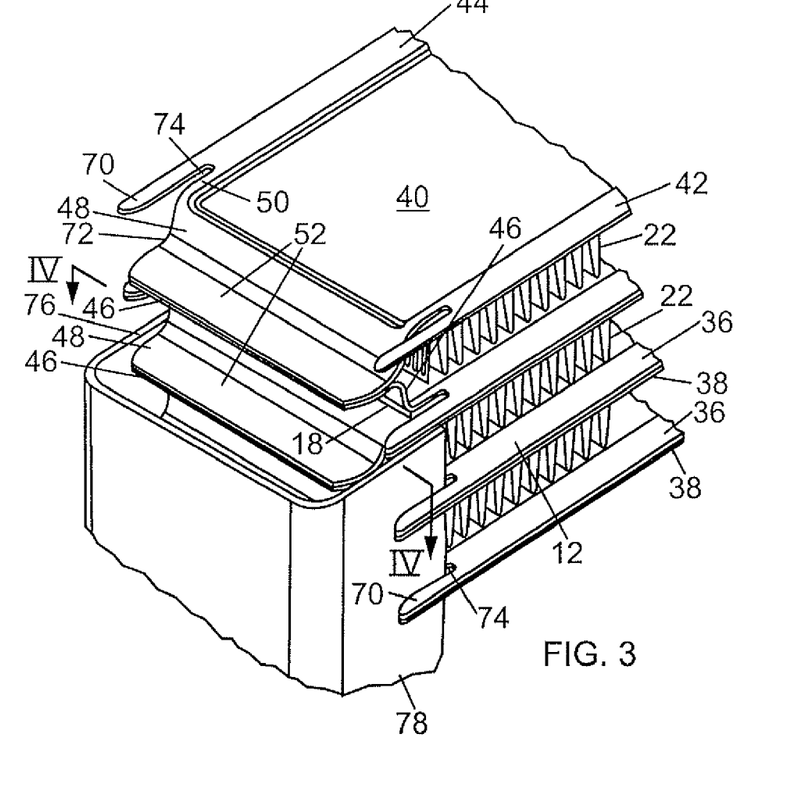
FIG. 3 is another perspective view showing a portion of the heat exchanger of FIG. 1 and certain construction details.

Turning now to the construction of the first members 12, in the illustrated construction, each first member can be formed by a plate pair which, in the illustrated, vertically extending heat exchanger, can include a top plate 36 and an underlying bottom plate 38 (see FIG. 3). Each plate pair has a central planar portion 40 and offset peripheral edge portions 42, 44. In this way, when the plates 36, 38 are placed against one another in a face-to-face manner, the peripheral edge portions 42, 44 are joined together, typically by a brazing process well known in the heat exchange industry, and the planar central portions 40 are spaced apart to define the aforementioned first passageways between the two plates, each first passageway extending between the aforementioned first inlet opening 18 and the outlet opening located at the opposite end of the plate pair.

As also seen in FIG. 3, the two plates 36, 38 of each pair have offset end flanges 46, 48. The end flanges at each end of each plate pair diverge from a root area 50 where the raised peripheral edge portions 42, 44 are still joined together to transverse distal edge portions or flange extensions 52. These transverse distal edge portions or flange extensions are joined together in back-to-back stack plate pairs. In this way, the first members 12 are appropriately spaced apart to provide the gaps 20 which form transverse flow passages between the plate pairs where the cooling fins 22 are located.

Figure 1:
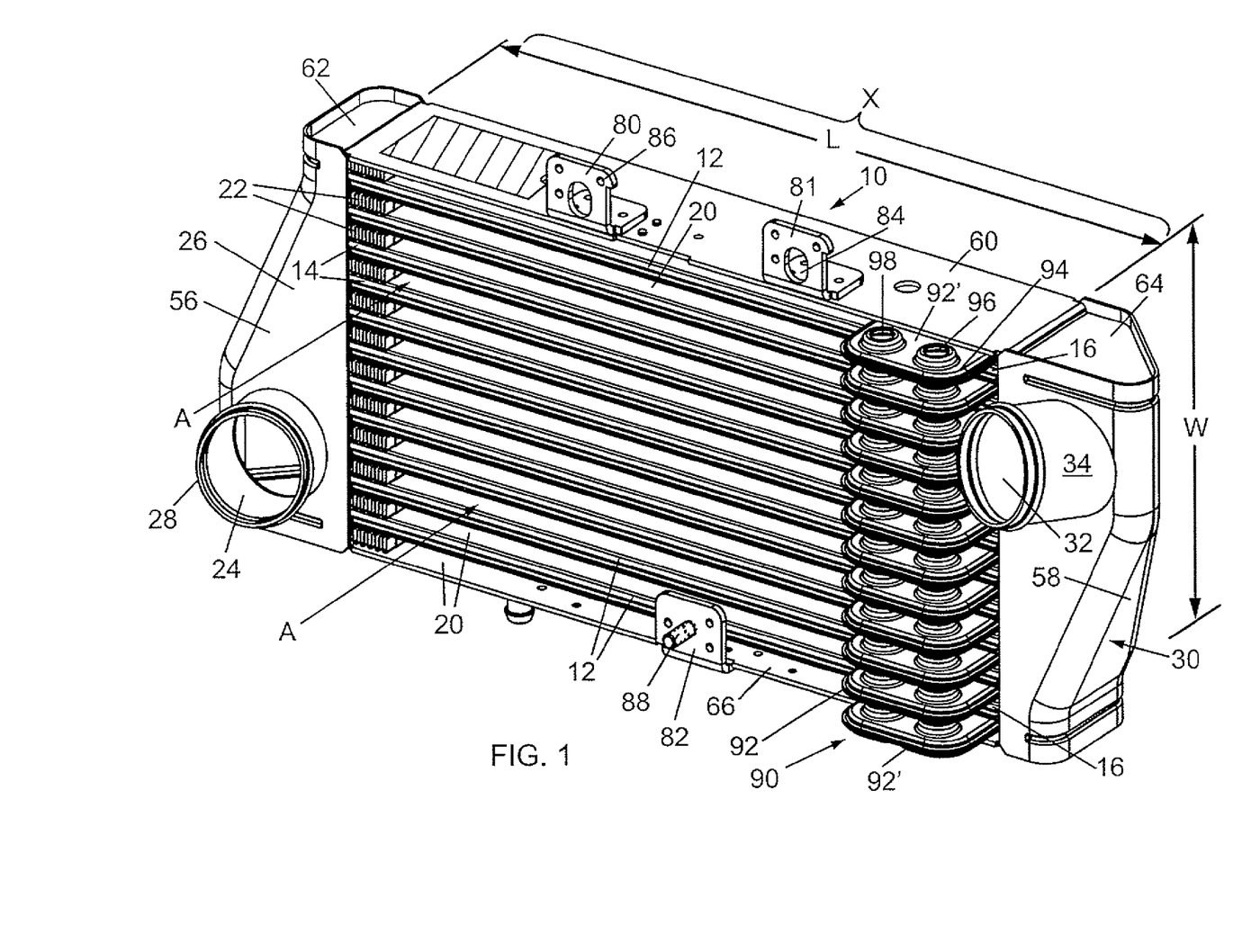
FIG. 1 is a perspective view of a heat exchanger suitable for use as a charge air cooler, this view being taken from above and from a right end thereof.

The inlet and outlet manifolds 26, 30 can be constructed in a similar manner, each by means of a generally U-shaped channel member 56, 58 which can vary in its transverse cross-section from its top end to its bottom end as shown in FIG. 1. These channel members can be made of formed aluminium sheet which can leave open ends that are suitably closed, as shown. In particular, there can be provided a substantially flat top plate 60 which can be formed with offset end portions 62, 64 to close the open ends at the top of the channel members 56, 58. In a similar manner, a bottom end plate 66 can be provided with opposite end extensions (not shown) to close the open ends at the bottom of channel members 56, 58. If desired, the end extensions on the top and bottom end plates 60, 66 can be formed with upwardly extending peripheral flanges to facilitate the connection of these end extensions in a sealing manner to the channel members. It will be appreciated that the generally U-shaped channel members 56, 58 could have other cross-sectional configurations than that shown, including trapezoidal or hemispheroidal. For purpose of this disclosure, the term "U-shaped" is intended to include any cross-sectional configuration that is capable of enclosing the offset end flanges 46, 48.

Figure 4:
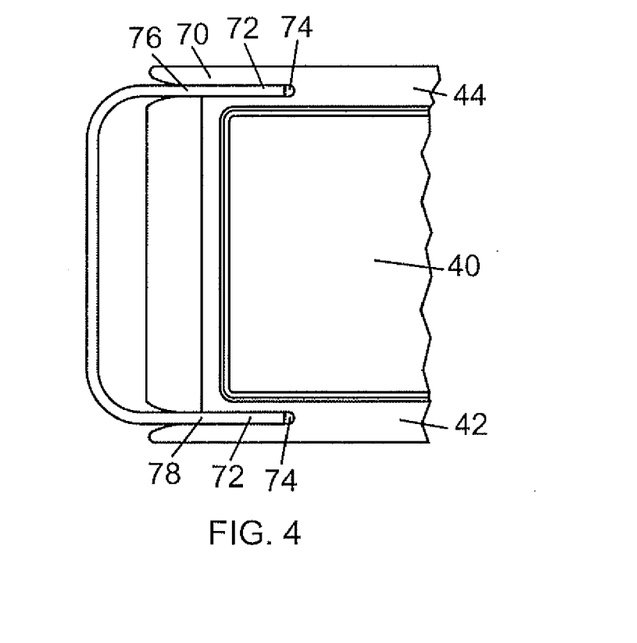
FIG. 4 is a plan view taken along the line IV-IV of FIG. 3.

With reference to FIGS. 3 and 4, it will be seen that the offset peripheral edge portions 42, 44 are formed with fingers 70 spaced from flange lateral edges 72 to define slots 74 to accommodate the U-shaped channel sidewalls 76, 78. The slots 74 can be slightly tapered inwardly to urge the sidewalls 76, 78 into tight engagement with the lateral edges 72. This provides a snug fit so that the channel members 56, 58 clip on and are retained in position during the assembly of the heat exchanger. The slots 74 can be slightly deeper than the portion of the side walls that extends into the slots.

Also shown in FIG. 1 are three mounting brackets 80 to 82. The brackets 80, 81 can be constructed in a similar manner and each can be mounted on the top plate 60 by rivets, screws or other suitable fasteners. These two brackets can each be provided with a central hole 84 formed in its vertically extending leg and additional smaller holes 86 if desired. It will be understood that the brackets 80 to 82 can be secured to adjacent supporting members or a support surface by means of suitable fasteners such as bolt and nut assemblies. The bracket 82 can be mounted on the bottom end plate 66 and may be fitted with a threaded shaft or a bolt at 88. It will be understood that the shaft 88 can be used to connect the bottom of the heat exchanger to a support member or support surface by means of a nut.

Figure 5:
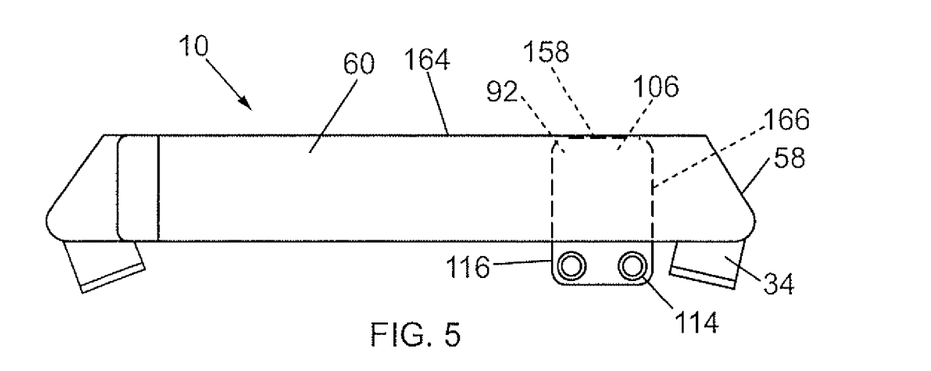
FIG. 5 is a schematic plan view of the heat exchanger of FIG. 1, this view showing the physical location of the flat tubes which make up the liquid coolant circuit.
Figure 6:
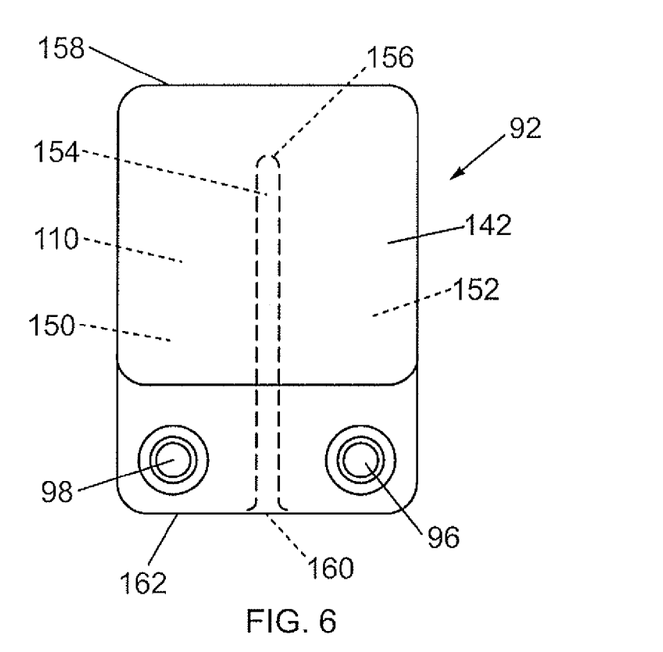
FIG. 6 is a plan view of a respective flat tube of the liquid coolant circuit, this view showing an interior baffle in the flat tube.

In addition to the aforementioned first fluid cooling arrangement, there is provided in the heat exchanger 10 an associated or additional cooling device indicated generally at 90 for circulating a liquid coolant such as water for heat exchange between this coolant and the flow of first fluid through the first passageways. As indicated, the term "first fluid" as used herein extends to both a gas such as air and a liquid such as oil. The cooling device 90 includes tube-like second members 92. The construction of one exemplary form of these second members can best be seen from FIGS. 2, 5 and 6. A plurality of the tube-like second members 92 are arranged in a row, which is a vertical row in the embodiment shown in FIGS. 1 and 2. Each second member includes an end portion 94 which projects from a main vertical side of the heat exchanger. In this embodiment, this projecting end portion defines a second inlet opening 96 and a second outlet opening 98. It will be seen that the tube-like second members in this exemplary embodiment are provided by a plurality of spaced-apart plate pairs with each plate pair in the vertically extending illustrated heat exchanger formed by top and bottom mating plates 100, 102. Each plate of the pair has a generally planar portion 104 which can include a central region and an inner end region 106 with these two regions being located in a respective gap 20 of the heat exchanger as illustrated in FIG. 1 and in FIG. 5. Each plate also has an offset peripheral edge portion 108 which extends completely about the periphery of the plate 100, 102 and which forms a connecting flange to join each plate to the other plate of the pair. It will be understood that the two adjacent peripheral edge flanges or portions can be joined in a permanent, sealing manner by a known method such as brazing. When the two flanges are joined in this manner, the planar portions 104 are spaced apart to define a flow channel which can be a U-shaped channel 110 as illustrated in FIG. 6.

Figure 2:
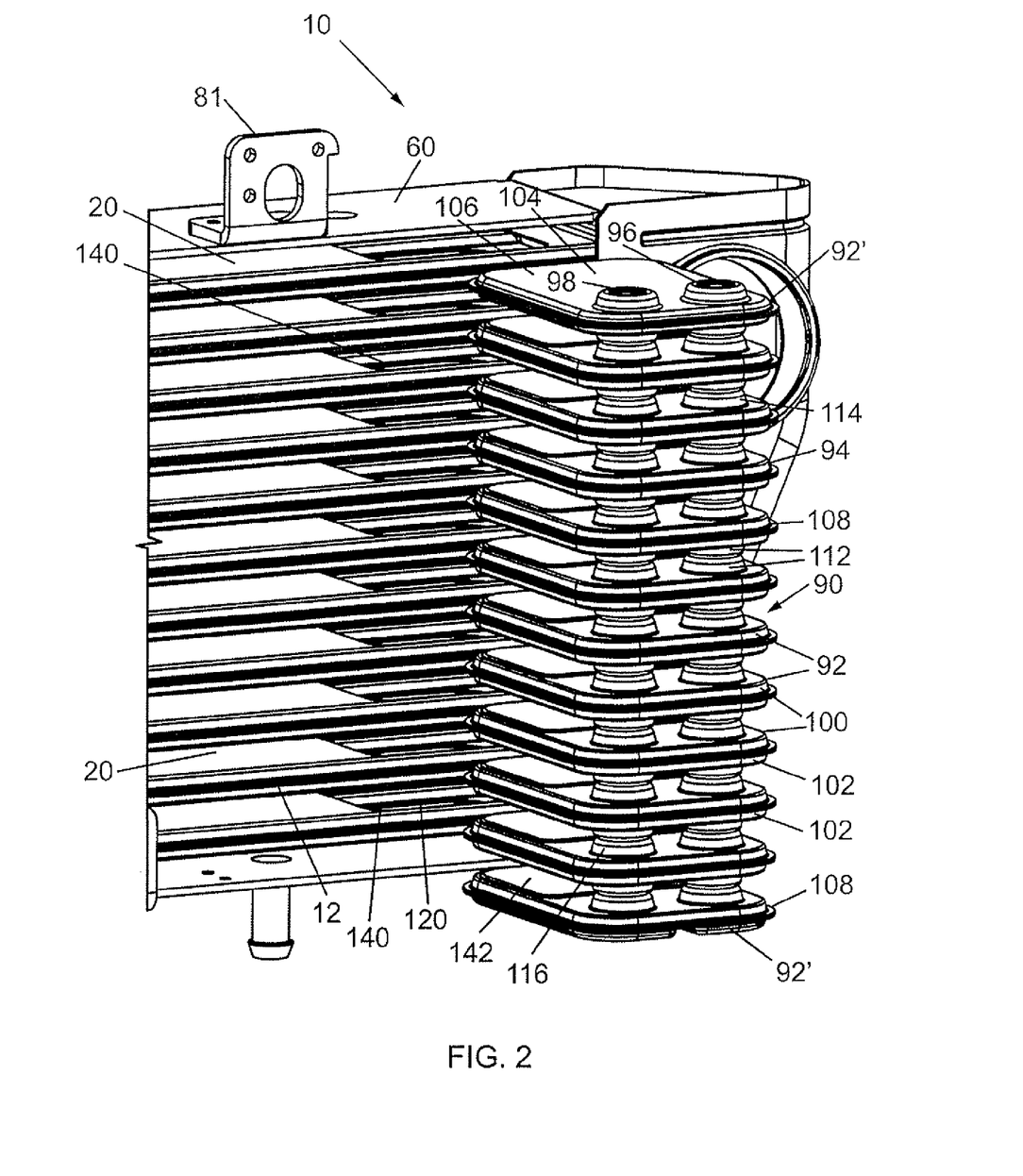
FIG. 2 is a perspective view of the right half of the heat exchanger of FIG. 1, this view showing the heat exchanger partially disassembled with the liquid coolant portion of the heat exchanger moved out of the elongate gaps formed in the main portion of the heat exchanger.

As can be seen most clearly in FIG. 2, in this exemplary version, each plate 100, 102 is formed with a pair of bubbles 112 which can also be described as short, annular extensions of the plate. Each pair of bubbles or annular extensions are mated with and joined in a sealing manner to adjacent annular extensions of an adjacent second member. The aforementioned inlet and outlet openings 96, 98 are formed in these bubbles. By joining these bubbles and their inlet and outlet openings together, there are formed a second inlet manifold indicated generally by reference 114 and a second outlet manifold indicated generally by reference 116. Thus, the liquid coolant, which can be water, introduced into the inlet manifold 114 is distributed into each of the generally flat, tubular second members 92 and this coolant or water is withdrawn from each of the second members 92 via the outlet manifold 116 for redistribution. In particular, the inlet and outlet manifolds 114, 116 can be coupled to a conventional pump and piping circuit (not shown) by means of conventional fittings (also not shown). The fittings to connect the inlet and outlet manifolds can be provided either at the top end or the bottom end of the manifolds or there can be one at the top with the other fitting at the bottom end. As illustrated in FIGS. 1 and 5, the generally flat sections of the second members 92 extend into the gaps 20 that are formed between tubular first members 12 and thus the liquid coolant circulating through the second members is disposed in heat conducting relation to the first fluid (such as charge air) passing through the passageways formed by the first members 12. The aforementioned cooling fins 22 (not shown in FIG. 2 for sake of clarity but shown in FIG. 1) are cut back sufficiently to permit the interposition of the second members 92 as shown. In particular, it should be understood that the fins 22 extend along the complete length of the first members 12 but for the space occupied by the tubular second members 92.

Also as a can be seen in FIGS. 1 and 2, the second members 92 include two outer second members indicated by 92' located at opposite ends of the row. In particular, when the heat exchanger 10 is arranged vertically as shown, the outer second members 92' constitute the top and bottom second members. The second members further include intermediate second members 92 located between the outer second members 92'. In the embodiment of FIGS. 1 and 2 it is these intermediate second members which each extend into a respective one of the elongate gaps 20 for heat exchange between the first fluid and the liquid coolant or water. In the case of the top second member 92', its generally flat portion is interposed between the top first member 12 and the top plate 60. In the case of the bottom second member 92', its planar portion is interposed in an elongate gap formed between the bottom plate 66 and the bottom first member 12.

It will be seen that the first members 12 and the elongate gaps 20, which can include a gap be formed between the top plate 60 and the top first member 12 and the gap between the bottom plate 66 and the bottom first member 12, form a primary heat exchange area indicated generally by reference X in FIG. 1. This area has a length extending at least most of the length of each first member 12 and indicated by L in FIG. 1. The width of this primary heat exchange area is equal to or approximately equal to the total of the heights of the first members 12 and the width of the gaps 20, this width being indicated by W in FIGS. 1 and 8. The portion of the area X which is occupied by the tube-like second members 92 can be considered a secondary heat exchange area. In the embodiment of FIG. 1, this secondary heat exchange area has a height approximately equal to the width W of the primary heat exchange area and has a width corresponding approximately to the width of the second members 92. In the heat exchanger of FIGS. 1 and 2, the second members 92 each extend into their respective gaps 20 at end section 120 of the gaps located adjacent one end of the heat exchanger. In the illustrated version, this one end of the heat exchanger is the end that is adjacent to and extends along the outlet manifold 30 but it will be appreciated that it is equally possible to locate the liquid coolant circuit or the water circuit in end sections of the gaps adjacent the manifold 26 or even at an intermediate location along the gaps 20. It will also be understood by a person skilled in the heat exchanger art that the smaller secondary heat exchanger area can be located at any desired position within the primary heat exchange area.

Figure 8:
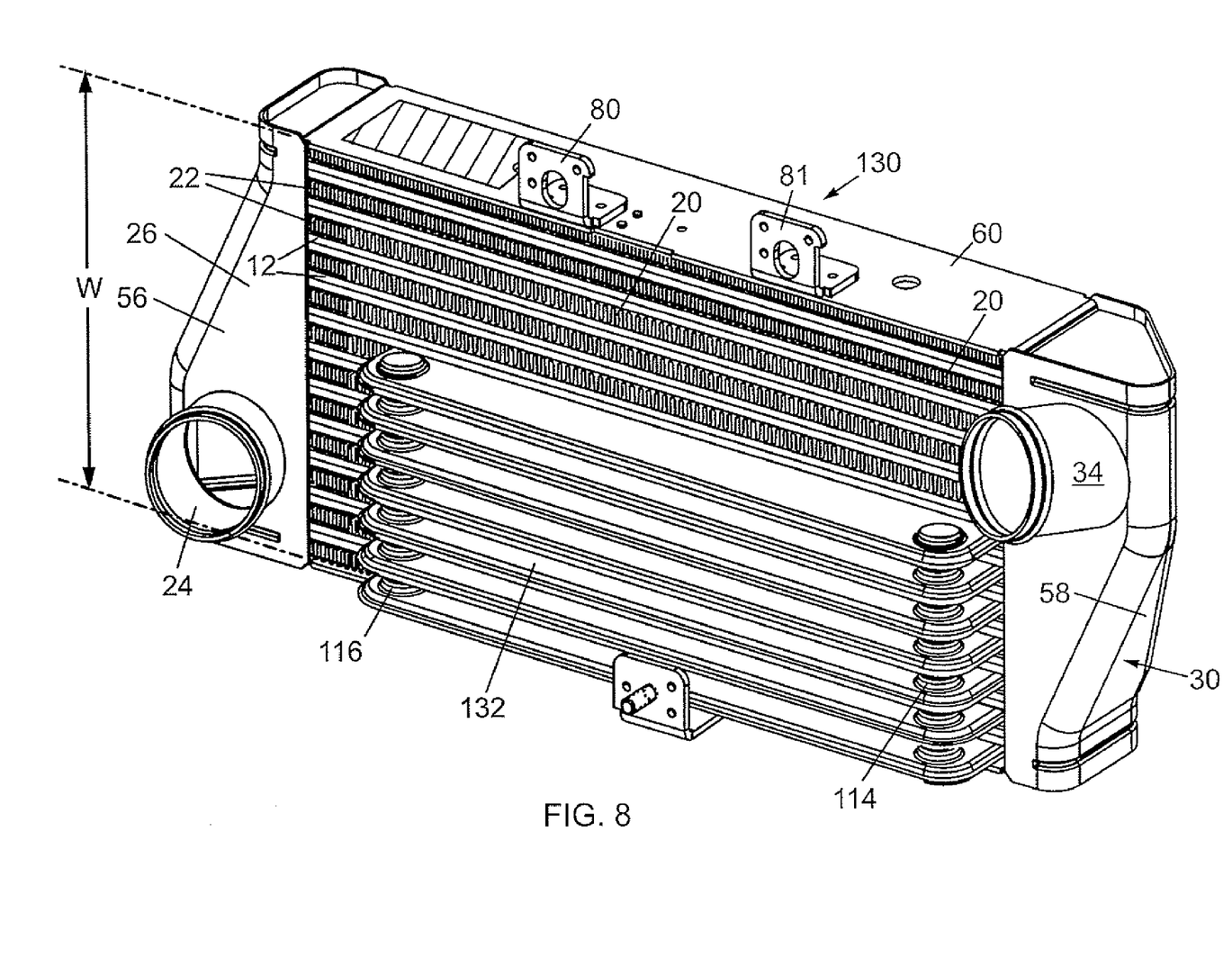
FIG. 8 is a perspective view similar to FIG. 1 but showing an alternate embodiment of a heat exchanger constructed in accordance with the invention.

FIG. 8 illustrates an alternate version of a heat exchanger constructed in accordance with the invention. This embodiment can also be used as a charge air cooler, if desired. This heat exchanger 130 is similar to the heat exchanger 10 of FIGS. 1 and 2 except for the differences noted hereinafter. In this embodiment, tube-like second members 132 each have a length dimension in the lengthwise direction of the first members 12 which is much greater than the corresponding dimension of the second members 92. The width of the second members as measured in the widthwise direction of the members 12 can be similar to the corresponding dimension of the second members 92. As shown in FIG. 8, the tubular members 132 do not occupy just an end portion of the gaps 20 that are formed between the first members 12 but rather occupy substantially all of their respective gaps. Furthermore, in the illustrated embodiment, the upper four gaps formed between the first members 12 have no second members positioned in them. Instead the second members are interposed in a series of the gaps 20 that extend along a lower portion of the heat exchanger. The upper four gaps 20 between the first members 12 can be completely filled by cooling fins 22 as can the narrower gap between the top first member 12 and the top plate 60. The top four tubular members in the illustrated embodiment are cooled by ambient air that passes through the upper gaps. The first member 12 located fifth from the top of this heat exchanger and the bottom first member 12 are cooled partly by ambient air and partly by the water or other liquid coolant. The remaining first tubular members 12 are cooled mostly or completely by the water or liquid coolant passing through the second members 132.

In the embodiment of FIG. 8, the second inlet manifold 114 is spaced a substantial distance from the second outlet manifold 116. These manifolds, which are formed in the same manner as the second manifolds shown in FIGS. 1 and 2, can be connected in each of the second members 132 by means of a passageway that can, if desired, be constructed in a serpentine manner so as to require the water or coolant to flow in a back and forth manner, the width and length of these second members. The provision of internal barriers to create such flow paths is well known in the heat exchange industry and accordingly a detailed description thereof herein is deemed unnecessary. These internal barriers prevent the water or coolant from simply flowing directly between the inlet manifold and the outlet manifold by means of the plate pairs. Instead of internal barriers or baffles to redirect the flow of the liquid, it is also possible to make one or both of the plates of each plate pair with a series of dimples that extend into the flow passageway for the purpose of creating a more efficient flow of the liquid coolant through the passageway. Alternatively, and in a known manner, it is possible to insert turbulizers in the coolant passageway formed by each plate pair.

Another exemplary feature of the heat exchanger 10 of FIGS. 1 and 2 (and a feature that can also be incorporated into the embodiment of FIG. 8) is to provide at least a portion of the first members 12 with cut-outs 140, these cut-outs being formed where the second members 92 extend into the elongate gaps 20. Each plate of each plate pair is formed with one of these cut-outs which can be substantially rectangular and can have rounded corners, if desired. These cut-outs are sealingly closed by adjacent sides of the second members 92. Although these cut-outs are not required in all embodiments, the use of same has the advantage of reducing the thickness of the metal layer that separates the liquid coolant from the charge air, thereby improving the level of heat exchange between the liquid coolant and the charge air. In order to properly and correctly locate the planar portion of each second member 92 relative to its respective cut-out 140, a planar raised area 142 can be formed on each plate of each plate pair, the size and shape of this raised area corresponding to that of the cut-out. By inserting these raised areas in their respective cut-outs during the assembly of the heat exchanger, the final brazing process to complete the heat exchanger will also seal the joint between each cut out and the adjacent plate filling the cut-out. The top plate of the second member 92' located at the top need not be formed with a raised area 142 as shown in FIG. 2 since it rests against the bottom surface of top plate 60. Similarly, the bottom plate of the bottom second member 92' need not be formed with the raised area 142. In the case of the embodiment illustrated in FIG. 8, the cut-outs (not shown) can be formed along most of the length of the lower series of first members 12 between which the second members 132 are to be inserted. The upper four first members 12 in this embodiment need not be formed with any cut-outs while the fifth from the top first member 12 can be formed with only a cut-out in its lower plate.

It will also be appreciated that instead of forming the cut-outs 140 in some or most of the first members 12, it is also possible to form similar cut-outs in the two plates which make up the pair of plates forming each second member 92, 132 and this will provide the same advantage of having only one layer of metal separating the liquid coolant or water from the first fluid such as charge air.

FIG. 6 is a top or plan view of an exemplary embodiment of the tubular second member 92. This member is formed with a U-shaped flow channel 110 as indicated, this channel flowing between inlet opening 96 and outlet opening 98. Thus, the flow channel includes two parallel passage sections 150, 152 which can be separated by an interior baffle 154. The baffle can be formed in a known manner and held in place by brazing, for example, when the second member itself is formed and sealed. For example, the baffle can be constructed from a suitable, straight aluminum strip having the same height as the flow channel 110. One end 156 of the baffle is spaced from the end 158 of the second member, thereby creating an internal opening which connects the two passage sections 152, 154. An opposite end 160 of the baffle terminates at the opposite end 162 of the second member so that the liquid coolant or water cannot flow directly between the inlet opening 96 and the outlet opening 98.

FIG. 5 is a schematic top view of the heat exchanger 10 of FIGS. 1 and 2 showing the physical location of the row of tubular second members 92. It will be seen that the second inlet manifold 114 and the second outlet manifold 116 are both located on one side of the heat exchanger 10. The ends 158 of the second members 92 can be aligned with an opposite side 164 of the heat exchanger. The sides 166 of the members 92 can be positioned in the gaps 20 so that they are immediately adjacent the manifold formed by channel member 58.

Figure 7:
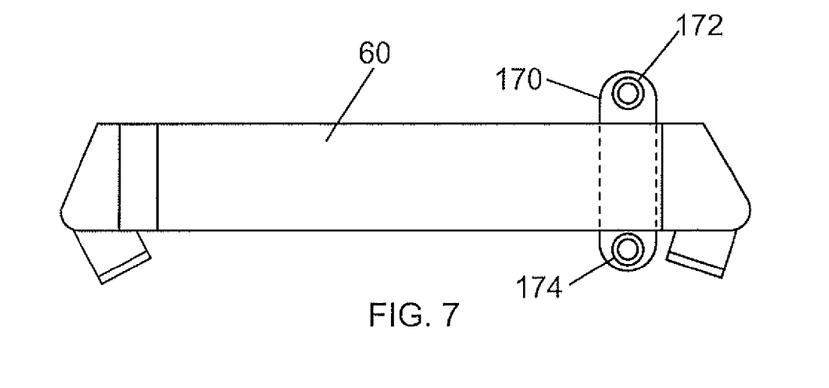
FIG. 7 is a schematic plan view similar to FIG. 5 but showing an alternate embodiment providing straight through flow in the liquid coolant tubes.

FIG. 7 illustrates an alternate version of the present heat exchanger for a cooler. This version is substantially similar to that illustrated in FIGS. 1, 2 and 5, except for the construction and arrangement of a plurality of tube-like second members 170 which are used instead of the second members 92. The second members 170 provide for a straight flow of the liquid coolant or water from an inlet manifold 172 to an outlet manifold 174. The members 170 are each formed from a pair of plates which are sealed together about their peripheral edges. It will be understood that each pair of these plates forms a straight passage or passageways between the inlet and outlet manifolds. The second inlet and second outlet manifolds are located on opposite sides of the portion of the heat exchanger formed by the tube-like first members 12 which can be constructed in the same manner as the first members in the embodiment of FIGS. 1 and 2.

In both of the embodiments of FIGS. 5 and 7, the tube-like second members 92, 170 have a thickness which is at least as great as the width of the individual gaps formed by the first members so that each second member fills the respective gap into which the second member extends in the widthwise direction of the gap. In those heat exchangers which are formed with the aforementioned cut-outs 140 in the first members, the thickness of the generally flat portions of the second members is actually greater than the width of an individual gap or can be greater in order to allow insertion of the raised areas 142 into their respective cut-outs. In a typical application, the components of the heat exchanger 10 are made of brazing clad aluminum. However, it will be appreciated that materials other than aluminum can be used for the heat exchangers of the present invention, even plastic for some of the components, if desired. Also, although the drawings illustrate tubular first and second members each made from a pair of plates sealingly connected together, it is possible to construct these members for some applications from seamless, flat tubes, particularly the first members that carry the first fluid such as charged air.

Various modifications may be made to these structures described above. For example, turbulizers can optionally be used between the plate pairs that form the second members 92, 170 and also between the plate pairs that form the first members 12. Also it is possible to use such turbulizers in both passage sections 150, 152 of a U-shaped channel in each second member 92 or in the single straight passage of each of the second members 170. Also, the plates which make up the tubular first and second members could be dimpled in their planar regions as is common in dimple plate heat exchangers. Also, other types of cooling fins could be used in place of the illustrated corrugated fins or no fins at all could be provided.

Another possible modification of the disclosed heat exchanger apparatus is the provision of a valve (or valves) that allows only liquid cooling of the charge air flow or alternatively, allows only air cooling of the charge air flow. Also a by-pass valve can be used to modulate flows of either or both of the charge air and liquid coolant. Furthermore, it is possible to provide a bypass valve together with a suitable bypass for the liquid coolant which is used when liquid cooling of the charge air is not required. The bypass valve (in a manner known per se) would operate to close off substantially (but not entirely) the flow of liquid coolant through the second members 92, 170 and direct this flow through the bypass when liquid cooling is not desired or not required. The bypass valve would not close off entirely the liquid flow through the members 92 or 170 in order to prevent the liquid inside these members from boiling. In one variant of such a bypass construction, one or more of the lowermost (or top most) second members 92 can be used to provide bypass passageways that can be open passageways with no turbulizers provided therein while the other second members are each fitted with turbulizer inserts. A suitable valve can then be provided to close off the inlet to the bypass passageways of the lowermost second member(s) when greater liquid cooling is desired. The valve can be in the form of a lightweight flapper which is substantially closed by increased flow of liquid in the bypass channel or channels.

Another way of using a bypass valve could involve a heat exchanger similar to that shown in FIG. 8 but with the tubular members 132 extending substantially the length of the heat exchanger. A bypass valve can then be used to bypass either the lower section of the heat exchanger so as to provide only air cooling of the fluid passing through the upper first members 12 or the upper section of the heat exchanger so as to provide only liquid cooling of the fluid.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

The invention claimed is:

1. A heat exchanger comprising:

a plurality of tube-like first members having respective first inlet and first outlet distal end portions defining respective first inlet and first outlet openings, said first members being spaced-apart from one another so that a series of elongate gaps are formed between the first members, said first members forming a plurality of first passageways for flow of a first fluid in heat exchange relationship with cooling air flowing through said gaps during use of said heat exchanger, said first members and said elongate gaps forming a primary heat exchange area having a length extending at least most of the length of one of the first members and a width equal to the total of the heights of said first members and the widths of said gaps;

opposed inlet and outlet manifold members connected respectively to said first inlet and outlet distal end portions, said inlet manifold being adapted to receive said first fluid and conduct said first fluid to said first inlet openings, said outlet manifold being adapted to receive the first fluid which has been cooled by said cooling air;

a plurality of tube-like second members arranged in a row and having end portions defining second inlet and second outlet openings, all of said second inlet openings being joined and all of said second outlet openings being joined so as to form respectively a second inlet manifold and a second outlet manifold, said second inlet manifold being adapted to receive a liquid coolant and conduct said liquid coolant to a plurality of second passageways formed by said second members, said second outlet manifold being adapted to receive said liquid coolant from said second passageways;

said second members including two outer second members located at opposite ends of the row and intermediate second members located between said outer second members, at least said intermediate second members each extending into a respective one of said elongate gaps for heat exchange between said first fluid and said liquid coolant, wherein said second members fill a portion only of said gaps, said portion extending over a secondary heat exchange area which is part of said primary heat exchange area.

2. A heat exchanger according to claim 1 wherein said gaps have cooling fins mounted therein and arranged to permit said cooling air to flow through said gaps and along said fins, said fins being arranged over at least most of the length and width of said primary heat exchange area excluding said secondary heat exchange area.

3. A heat exchanger according to claim 2 wherein at least said intermediate second members each extend into their respective gaps at end sections of the gaps located adjacent one end of the heat exchanger, said secondary heat exchange area having one dimension substantially equal to the width of said primary heat exchange area, said one dimension extending in the widthwise direction of the primary heat exchange area.

4. A heat exchanger according to claim 2 wherein at least said intermediate second members each extend into their respective gaps along at least most of the lengths of the gaps and at least two of the elongate gaps have no second members extending into them.

5. A heat exchanger according to claim 2 wherein each of said inlet and outlet manifolds comprises an elongate, generally U-shaped channel that envelopes the adjacent distal end portions of the tube-like first members and end caps that close opposite open ends of the U-shaped channel to complete the manifold and wherein said first fluid is charge air.

6. A heat exchanger according to claim 2 wherein each first member forms a generally flat tube and comprises a pair of elongate plates sealingly joined together along their longitudinal edges, the first passageway of the first member being formed between the two joined longitudinal edges.

7. A heat exchanger according to claim 6 wherein each second member forms a generally flat tube and comprises a pair of plates sealingly joined together about their peripheral edges, each plate of said pair being formed with two short, annular extensions, and wherein each pair of annular extensions formed on said second members are mated with and joined to adjacent annular extensions of an adjacent second member to form said second inlet and outlet manifolds.

8. A heat exchanger according to claim 1 wherein at least a portion of said first members are each formed with two cut-outs in opposite flat sides thereof, said cut-outs being formed where said second members extend into said elongate gaps and being sealingly closed by adjacent sides of the second members.

9. A heat exchanger according to claim 8 wherein said second passageways formed by the second members are U-shaped so that each second passageway has two parallel passage sections which are separated by an interior baffle, and wherein said second inlet and outlet manifolds are both located on one side of the heat exchanger.

10. A heat exchanger according to claim 8 wherein said second passageways formed by the second members are straight between said second inlet and second outlet openings so that said second inlet and second outlet manifolds are located on opposite sides of the portion of the heat exchanger formed by said tube-like first members.

11. A charge air cooler for vehicles, comprising:
a plurality of first members forming a row of tubes which are spaced-apart from one another and parallel so that a series of elongate gaps are formed between and are defined by the first members, said first members forming a plurality of first passageways for flow of charge air in heat exchange relationship with cooling air flowing through said gaps during use of said heat exchanger, said first members and said gaps forming a primary heat exchange area having a first length extending at least most of the length of one of said first members and a first width;
a first inlet manifold extending along one end of the air cooler and fluidly connected to adjacent first ends of the first members to direct charge air flow into said first passageways;
a first outlet manifold extending along an opposite end of the air cooler and fluidly connected to adjacent second ends of the first members to receive said charge air flow from said first passageways; and
an associated cooling device for circulating a liquid coolant for heat exchange between said liquid coolant and said flow of charge air through said first passageways, said cooling device including tube-like second members each extending into a respective one of said elongate gaps in a secondary heat exchange area which has a second length extending in the direction of said first length and a second width extending in the same direction as said first width and is part of said primary heat exchange area, said secondary heat exchange area being defined by at least one of the following two requirements:
  (i) the second length being substantially less than the first length;
  (ii) the second width being substantially less than the first width of the primary heat exchange area,
wherein a substantial portion of the areas of said gaps bound by said primary heat exchange area remain open for flow of said cooling air.

12. A charge air cooler according to claim 11 wherein the second length of said secondary heat exchange area is substantially equal to said first length of the primary heat exchange area and the second width of said secondary heat exchange area is substantially less than the first width of the primary heat exchange area.

13. A charge air cooler according to claim 11 wherein the second width of the secondary heat exchange area is substantially equal to the first width of the primary heat exchange area and the second length of the secondary heat exchange area is substantially less than half the first length of the primary heat exchange area.

14. A charge air cooler according to claim 11 wherein said tube-like second members are generally flat tubes each having a thickness at least as great as the width of the individual gaps so that each second member fills the respective gap into which the second member extends in the widthwise direction of the gap.

15. A charge air cooler according to claim 11 wherein said first members are generally flat tubes having two opposite flat sides and at least a portion of said first members are formed with cut-outs formed in said flat sides and located in said secondary heat exchange area, said cut-outs being sealingly closed by flat sides of the second members.

16. A heat exchanger suitable for a vehicle, comprising:
a plurality of generally flat, tubular, first members arranged in a row and forming a series of elongate gaps which are defined by and extend between the first members, said first members providing a series of first passageways for flow of a first fluid in heat exchange relationship with cooling air flow flowing through said gaps during use of said heat exchanger, said first members and said gaps forming a primary heat exchanger area having a length extending at least most of the length of one of the first members and a width substantially equal to the total of the widths of said gaps and the thicknesses of the first members;

a first inlet manifold extending along one end of the heat exchanger and fluidly connected to adjacent first ends of the first members to direct first fluid flow into said first passageways;

a first outlet manifold extending along an opposite end of the heat exchanger and fluidly connected to adjacent second ends of the first members to receive said first fluid flow from said first passageways; and an associated cooling device for circulating a liquid coolant for heat exchange between said liquid coolant and said flow of first fluid through said first passageways, said cooling device including generally flat, tube-like second members each extending into a respective one of said elongate gaps in a secondary heat exchange area, which is part of said primary heat exchange area and substantially smaller than said primary heat exchange area, said second members each having a thickness at least as large as the width of their respective gaps so that each second member fills its respective gap in the widthwise direction of the gap.

17. A heat exchanger according to claim 16 wherein at least a portion of said first members are formed with cut-outs in opposite flat sides of these first members, said cut-outs being located in said secondary heat exchange area and sealingly closed by flat sides of the second members.

18. A heat exchanger according to claim 17 wherein said gaps have cooling fins mounted therein and arranged to permit said cooling air to flow through said gaps and along said fins, said fins being arranged over a major portion of said length of the primary heat exchange area.

19. A heat exchanger according to claim 16 wherein said second members form respective second passageways for said liquid coolant, said second passageways are U-shaped so that each second passageway has two parallel passage sections which are separated by an interior baffle, said second members are formed with bubble extensions which are sealingly joined to form a second inlet manifold located at one end of the second passageways and a second outlet manifold for said liquid coolant located at an opposite end of the second passageways, and said second inlet and outlet manifolds are both located on one side of the heat exchanger.

20. A heat exchanger according to claim 18 wherein each second member comprises a pair of plates sealingly joined together about their peripheral edges, each plate of said pair being formed with two short, annular extensions, and wherein each pair of annular extensions formed on said second members are mated with and joined to adjacent annular extensions of an adjacent second member to form said second inlet and outlet manifolds.

* * * * *